United States Patent [19]

Lythgoe

[11] Patent Number: 4,764,198
[45] Date of Patent: Aug. 16, 1988

[54] GLASS MELTING TANKS AND REFRACTORY MATERIAL THEREFOR

[75] Inventor: Stanley Lythgoe, Newburgh, England

[73] Assignee: Pilkington Brothers PLC, St. Helens, England

[21] Appl. No.: 115,561

[22] Filed: Oct. 29, 1987

Related U.S. Application Data

[63] Continuation of Ser. No. 802,384, Nov. 27, 1985, abandoned.

[30] Foreign Application Priority Data

Nov. 30, 1984 [GB] United Kingdom ............... 8430312

[51] Int. Cl.⁴ .............................................. C03B 5/225
[52] U.S. Cl. ...................................... 65/339; 65/346; 65/374.13; 501/107
[58] Field of Search ............... 65/347, 374.13, 337, 65/339, 345, 346; 501/107

[56] References Cited

U.S. PATENT DOCUMENTS

| | | | |
|---|---|---|---|
| 2,068,925 | 1/1937 | Muholland | 65/374.13 X |
| 2,675,323 | 4/1954 | Busby et al. | 501/107 |
| 2,928,212 | 3/1960 | Long | 65/374.13 X |
| 3,245,830 | 4/1966 | Flexon et al. | 65/346 X |
| 3,249,449 | 5/1966 | Kiehl et al. | 65/107 X |
| 3,437,499 | 4/1969 | Horak et al. | 65/107 |
| 4,494,974 | 1/1985 | Vilk et al. | 65/337 |

*Primary Examiner*—Robert L. Lindsay
*Attorney, Agent, or Firm*—Burns, Doane, Swecker & Mathis

[57] ABSTRACT

The glass melting tank for supplying a flat glass forming process has a melting zone for melting solid batch material and a refining zone with reduced return flow of glass. The base of the refining zone comprises a fusion cast refractory material comprising alumina, silica and between 31% and 43% by weight of zirconia. The refractory is conditioned by oxidation at at least 1450° C. for 24 hours.

16 Claims, 3 Drawing Sheets

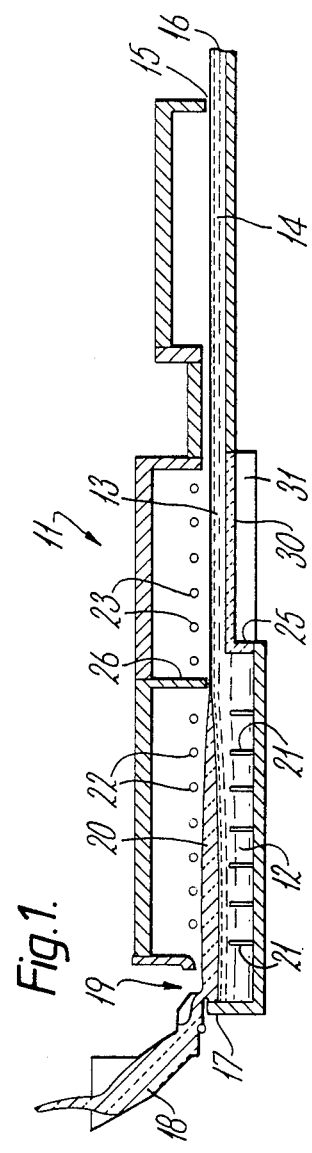
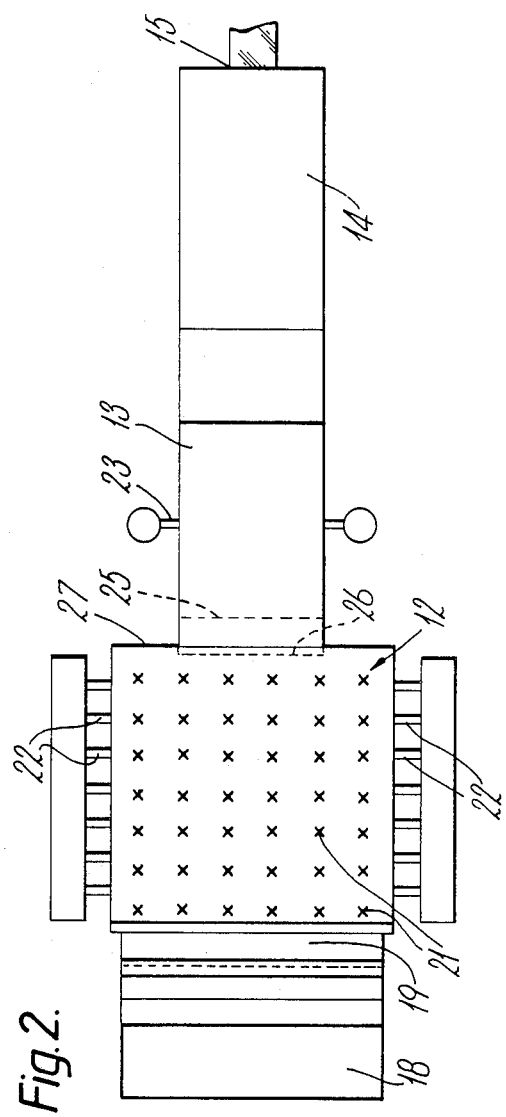

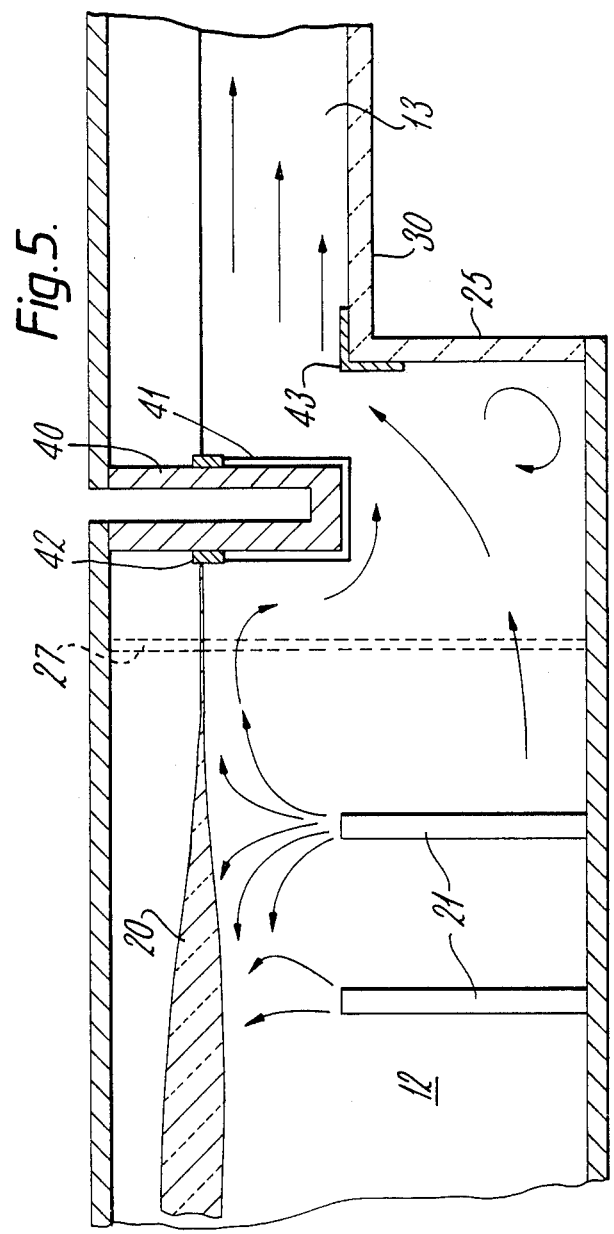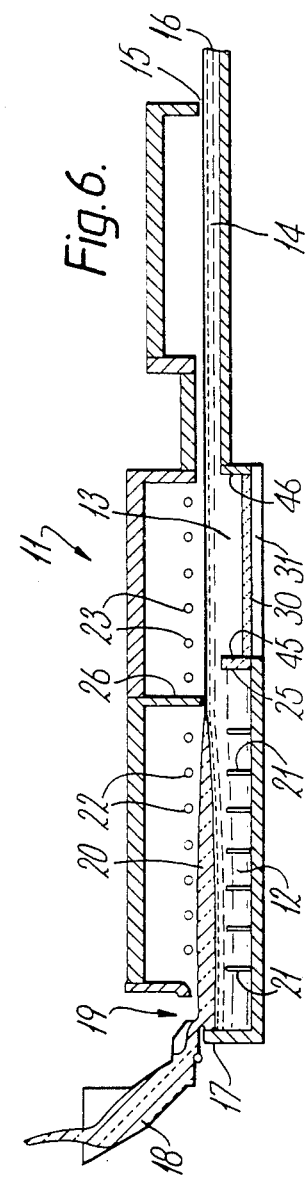

GLASS MELTING TANKS AND REFRACTORY MATERIAL THEREFOR

This application is a continuation of application Ser. No. 802,384, filed Nov. 27, 1985, abandoned.

BACKGROUND OF THE INVENTION

The invention is particularly applicable to glass melting tanks of the size and capacity used in the manufacture of molten glass to be fed to a flat glass forming process such as the float process. Such tanks provide glass for forming on a float bath at a rate sufficient to produce as much as 6000 tonnes and not less than 500 tonnes of finished saleable glass per week. In such tanks solid batch material for forming the glass is normally fed into a melting zone of a glass melting tank where heat is applied to melt the batch material. The melting zone forms an upstream cell and this is normally followed by a downstream cell in which refining and conditioning of the glass occur before the glass is fed through an outlet to a glass forming process. This has been described in our UK Patent Specification No. 1503145. There are problems in providing homogeneous glass free from undissolved solios and gases particularly at high tank loads when time and temperature in particular zones are limited by furnace design and refractory constraints. Glass varying in composition forms layers in the furnace and these are subject to convective and other flows imposed by the furnace operation and other physical operations which may be carried out on the glass. In general, in the final product any inhomogeneity may exist as plates in the glass and where these are not parallel to the faces of flat glass which is subsequently formed, optical faults called ream may result. The object of refining and conditioning is to attempt to control bubble level homogeneity, ream, orientation of any inhomogeneity and temperature condition of the glass as it leaves the melting tank. Commonly the melting and refining regions of the tank are arranged to hold glass of such a depth that convection occurs resulting in forward and return flows of molten glass in both zones. It is also common practice to provide heat in the melting zone of such a glass melting tank by use of fossil fuels used to fire burners located adacent ports in the melting zone located above the level of the batch material which may form a blanket on top of the molten glass in the melting region. Such burners may in some cases be assisted by electrical heating provided by electrodes mounted in the melting zone in the molten glass. In such a glass melting tank, the region where the melting zone joins the refining zone may form a so-called "hot-spot" in which the glass is at its highest temperature and forms an uprise region in which glass tends to flow from the bottom of the tank towards the surface of the molten glass. This may cause convection flows resulting in forward flowing glass moving through the refining zone towards the outlet end with a proportion of the glass forming a return flow through the refining zone which passes in contact with the base of the refining zone and subsequently rises again at the hot-spot for recycling through the refining zone. Similarly some glass rising at the hot spot will tend to form a return flow in the melting zone in the upper regions of the molten glass immediately below the blanket of batch material and this will circulate to form a forward flow at the base of the melting zone where it may rise again at the hot-spot. The convection flows which result in such a case depend on the hot-spot temperature as well as the furnace load and the temperature gradient in the molten glass. The temperature at the hot-spot can be as high as 1500° C. in the case of molten glass being prepared for use in a float forming process. Similarly the temperature at the bottom of the melting zone may be of the order of 1100° C. to 1300° C. In regions of forward and return flow the depth of glass in the tank may be in the order of 100 to 125 centimeters.

The provision of a relatively deep refining zone in which such circulation of glass due to convection currents occurs has been considered important in the production of high quality molten glass such that float glass may be produced with not more than 2 inclusions per kilogram wherein an inclusion is defined as any defect over 50 microns in size. The reason why the circulation within the refining zone has been important is that only a small portion of the newly melted glass leaves the furnace without being recirculated through the refining zone and this provides more time for removal of defects and reducing the overall level of occurrence of defects. Furthermore that portion of the forward flowing glass which flows from the refining zone towards the outlet end is conveyed through the refining zone on a roller of molten glass out of contact with the refractory at the base of the refining zone thereby avoiding contact with, and contamination by, the refractory base. The refining zone is inevitably a very hot region in order to allow satisfactory refining to occur. The return flow of glass in the refining zone which is in contact with the refractory at the base of the refining zone may develop defects due to interaction with the refractory but if this occurs it is returned to the hot-spot region which recirculates the glass at an increased temperature providing a further opportunity for the dissolution of solid inclusions and the escape of gaseous inclusions before the glass leaves the tank. In order to achieve satisfactory operation it is important that the position of the junction between the melting and refining regions is stabilised so that the effect of the circulation patterns within the melting and refining zones is predictable in achieving the required result in the glass which is finally supplied through the outlet of the glass melting tank. Any changes in thermal conditions which may alter the location of the hot-spot can have an adverse effect on the quality of the glass. For this reason various physical components have been used to improve the stability of the flow regime in such glass melting tanks. For instance, waists, weirs, floaters, water pipes, bubblers and other devices have been used to maintain an equilibrium state. In this way stability and high glass quality have been achieved. However these devices have the disadvantage of requiring fossil fuels for burners located above the batch material in the melting zone in order to cause the required circulation patterns within the melting zone and thermal inefficiency occurs due to the need to reheat the return flow of glass in the refining zone which is cooled and then reheated on rising at the hot-spot. Furthermore the furnace construction is large and the capital cost is high. Furthermore any changes from one glass composition to another such as may be needed to introduce a changing colour require protracted operation of the furnace in order to cause the gradual change in composition required.

In our UK Patent Specification No. 1533979 we have described a glass melting tank in which the area of the melting tank known as the conditioning zone is relatively shallow and in which there is no, or substantially no, return flow of molten glass away from the outlet end. In the case of a conditioning zone the glass is cooler than that in a refining zone as there is a progressive reduction in molten glass temperature on passing downstream from the hot-spot through the refining zone and through the conditioning zone to the outlet. There are problems in providing a relatively shallow refining zone in which all, or substantially all, the flow is towards the outlet end due to the high temperatures required in refining glass for feeding to a float process. In order to achieve a state of no return flow in the refining zone the depth of molten glass in the refining zone may be reduced to the order of 25 to 30 centimeters and the temperature used in refining soda lime glass may result in a glass/refractory interface at the bottom of the refining zone at a temperature of 1430° C. to 1450° C. This may be of the order of 200° C. hotter than would be the case at the bottom of a refining zone where the glass is of 100 to 125 centimeters depth with return flow at the bottom of the refining zone. Generally, molten glass in contact with refractory at the bottom of the refining zone at temperatures as high as 1430° C. to 1450° C. tends to introduce defects such as bubbles of gas and particles of refractory.

The refractory material of the present invention has enabled this problem to be overcome. It has previously been proposed to provide a layer of molten metal such as tin at the base of a refining zone but there are formidable problems to be solved in containing and maintaining molten metal within the refining zone.

SUMMARY OF THE INVENTION

It is an object of the present invention to provide a glass melting tank in which there is a reduced need for return flow of molten glass in the refining zone. The main flow in the refining zone may be towards the outlet end with little or no return flow towards the melting zone.

It is also an object of the invention to provide a glass melting tank with such a refining zone in which a substantial proportion of the heat input is provided by electrical heating means.

It is also an object of the present invention to provide an improved refractory material which may be used in a glass melting tank, particularly in a refining zone of a glass melting tank in which there is little or no return flow in the refining zone.

The present invention provides a fusion cast refractory for use in a glass melting tank, which refractory comprises alumina, silica and between 31% and 43% by weight of zirconia, the refractory being conditioned by oxidation at a temperature of at least 1450° C. for a period of at least 24 hours whereby the refractory may be used in contact with molten glass at a temperature of 1450° C. without excessive interaction between the molten glass and the refractory.

The present invention also provides a method of treating a refractory for use in a glass melting tank, which method comprises heating a fusion cast refractory of alumina, silica and between 31% and 43% by weight of zirconia at a temperature of at least 1450° C. for a period of at least 24 hours so as to cause oxidation whereby the refractory may be used in contact with molten glass at a temperature of 1450° C. without excessive interaction between the molten glass and the refractory.

The present invention also provides a glass melting tank having a melting zone for melting batch material to form molten glass and a refining zone for refining the molten glass, the refining zone providing a shallow glass flow path wherein the major portion of the glass flow is forwards away from the melting zone, said refining zone having a fusion cast refractory material in contact with the molten glass, said refractory material comprising alumina silica and between 31% and 43% by weight of zirconia.

If the refining zone is deep enough to permit some return flow then the ratio of the quantity of glass in return flow to forward flow will preferably be less than 1:2. The present invention makes use of fusion cast refractory which has been suitably conditioned by high temperature treatment so that bubbles or stones are not introduced into the molten glass even at the temperatures used in a uniflow refining zone of a glass melting tank. The fusion cast refractory may be conditioned by maintaining in contact with molten glass at temperatures of 1450° C. or more for a period of at least 24 hours. The conditioning should preferably be at a temperature of 50° to 100° C. higher than the temperature required for the molten glass which will be in contact with the refractory material in the refining zone. The refractory may alternatively be conditioned by heating in an oxidising atmosphere for similar temperature and time conditions. In both cases it has been found that the refractory material may be used to form blocks at the base of the refining zone. The heat treatment of the refractory to achieve satisfactory conditioning of the refractory may last for several days if carried out at the operating temperature of the refining zone.

In a preferred embodiment, the refining zone has a base formed of a fusion cast refractory material comprising alumina silica and between 33% and 40% by weight of zirconia.

Preferably the melting zone provides a deeper region of molten glass in which glass may flow in a forward direction towards the refining zone and in a return direction away from the refining zone.

Preferably the tank includes a step between a deep region of the melting zone and a shallower region of the refining zone. The refining zone may include means adjacent its junction with the melting zone to prevent any return flow in the refining zone from re-entering the melting zone.

Preferably the refining zone is narrower than the melting zone. The melting zone may include means restricting the flow path into the refining zone.

The means restricting the flow from the melting zone may include means inhibiting surface flow of molten glass from the melting zone into the refining zone. This means may comprise a restricted aperture in an end wall of the melting zone adjacent the refining zone.

Preferably the melting tank includes a conditioning zone located between the refining zone and an outlet. In one embodiment the conditioning zone is arranged to contain the same depth of glass as the refining zone and the depth is such that the glass flow through both the refining and conditioning zones is entirely towards said outlet with no return flow.

Preferably the melting zone is provided with heating means for applying heat to melt the batch material, said heating means may include electrical heating means arranged to provide at least 15% of the heat requirement to melt the batch material.

The heating means may include a plurality of electrical heating electrodes located within the melting zone.

The glass melting tank as aforesaid may be arranged to supply glass to a flat glass forming process such as a float process. The tank may have an output of the order of 500 tonnes or more per week. The energy input may be all electric. It may also include burners used in gas or oil firing.

The invention is particularly applicable to electric furnaces or furnaces using electric heating for at least 15% of the total energy input. In the latter furnaces the convection flow within the melting zone is not so strongly established due to the heating caused by the electrodes immersed in the molten glass rather than burners applying heat above the surface of the molten glass. There is a greater risk of displacing the hot-spot which in turn creates instability of the blanket of unmelted material and there is a risk of energy passing in a wasteful manner from the melting end to the conditioning zone. It will be appreciated that with the circulation flows referred to above, the hot-spot provides a limit to the downstream extent of the unmelted batch material and the return flow in the upper part of the melting zone tends to cause the downstream edge of the blanket to be restrained against flow towards the refining zone. The problem of hot spot displacement can be reduced by use of a glass tank according to the present invention.

Electric melting tanks may also be of a "cold top" type in which there is a centrally uniform blanket coverage of a fixed thickness of batch material over the whole melting area of the tank. Alternatively there are "progressive melting" tanks in which batch is fed from one or more points onto the molten glass and the blanket becomes progressively thinner on moving from the feeding point. In this case additional surface heating is necessary to ensure that no unmelted batch material passes into the refining zone. In both cases, throats may be used to control the flow from the melting zone to the refining zone but the life of such throats is relatively limited and may cause electrically fired tanks to have lives of only one-half those of fuel fired tanks without such throats. A refining zone in which return flows are reduced or eliminated can be used with throated furnaces, or with electric furnaces without throats. A throat may comprise a restricted flow passage below the surface of the molten glass.

Furthermore, the use of a refining zone in which return flows are substantially reduced or eliminated reduces the quantity of glass flow forwardly from the hot-spot as the entire glass flow, or a higher proportion of the glass flow, is fed to the outlet without being returned to the hot spot. Such refiners may have a smaller plan area for a given load than conventional deep refiners while retaining a similar longitudinal temperature gradient for example 1450° C. at the entrance to the refining zone to 1400° C. at the exit.

BRIEF DESCRIPTION OF THE DRAWINGS

FIG. 1 is a section through a glass melting tank in accordance with the present invention the tank having electric and fuel fired heating, and no return flow in the refining zone, FIG. 2 is a plan view of the glass melting tank of FIG. 1, FIG. 5 is a section through part of an electric furnace in accordance with the present invention, and FIG. 6 is a view similar to FIG. 1 of a further embodiment in which the refining zone is deep enough to permit a small return flow of molten glass.

DESCRIPTION OF THE PREFERRED EMBODIMENTS

Figure 3:
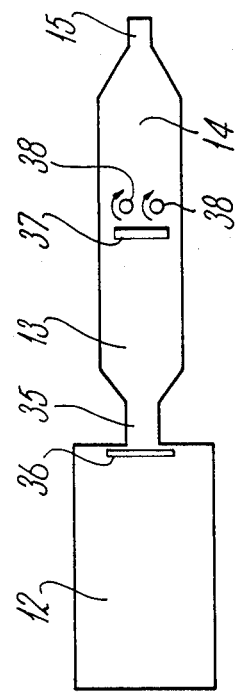
FIG. 3 is a schematic plan view of an alternative arrangement for the tank shown in FIG. 2.

The example shown in FIGS. 1 and 2 comprises a glass melting tank 11 having a melting zone 12, refining zone 13 and a conditioning zone 14 leading to an outlet 15. The outlet 15 is arranged to supply molten glass 16 to a flat glass forming process such as a float process. The tank is arranged to provide an output of between 500 and 6000 tonnes per week. At the inlet end 17 solid batch forming material 20 is fed from a feeder 18 into a transverse pocket 19 such that a blanket of solid batch material 20 lies on the surface of molten glass in the melting zone. Heat is applied to the melting zone by a plurality of electric heaters in the form of electrodes 21 immersed in the molten glass as well as fuel fired burners operating with gas or oil through a plurality of ports 22 in the side walls of the tank. Fuel fired heat is also provided through ports 23 in the side walls of the refining zone. In this particular example the refining zone 13 is relatively shallow so that all glass flows in the same direction away from the melting zone 12 towards the outlet 15. There is no return flow. The conditioning zone 14 is of the same depth as the refining zone and again all glass flow is in the same direction towards the outlet. The melting zone is however much deeper than the refining zone and is deep enough for forward and return flows due to convection to occur within the melting zone. The base of the deep section is separated from the base of the shallow section by a vertical step 25. As can be seen from FIG. 2, the melting zone 12 is much wider than the refining and conditioning zones which are of the same width. A curtain wall 26 is constructed across the entrance to the refining zone in line with the end wall 27 of the melting zone. This wall 26 terminates closely above the surface of the molten glass and provides an atmosphere seal and radiation barrier between the melting and refining zones so that the conditions in each zone can be individually determined.

In this particular example the refining and conditioning zones 13 and 14 may have a width of between 4 and 5 meters whereas the melting zone 12 may have a width of 10 meters. In the arrangement shown in FIGS. 1 and 2, the electrodes 21 are arranged to provide more than 15% of the energy requirement for the melting tank. In this particular case the electrodes consist of 7 transverse rows each having 6 vertical molybdenum rod electrodes in an electrical polyphase connection. In this case the batch material is fed from the inlet end only and melting occurs progressively along the length of the melting zone so that the blanket terminates prior to reaching the wall 26. The burners for fuel firing include waste gas exhaust ports and facilities exist for shutting off individual ports as required. The molten glass is hottest at the downstream end of the melting zone 12 so that the glass entering the refining zone is hot enough to permit refining to occur. The glass in the refining zone in the case of soda lime glass may be of the order of 1450° C. and to avoid unwanted interaction between the refractory material at the base of the refining zone and the molten glass, the base 30 is formed of fusion cast refractory comprising alumina silica and zirconia. The proportion of zirconia may be selected between 31% and 43% by weight of zirconia. Various examples of refractory compositions which may be used are as follows:

|  | $Al_2O_3$ | $ZrO_2$ | $SiO_2$ | $Na_2O$ |
|---|---|---|---|---|
| Example 1 | 50.7 | 32.5 | 15.7 | 1.1 |
| Example 2 | 46.1 | 40.8 | 12.3 | 0.8 |
| Example 3 | 49.3 | 34.0 | 15.5 | 1.2 |
| Example 4 | 47.4 | 37.0 | 14.5 | 1.1 |
| Example 5 | 46.0 | 40.0 | 13.0 | 1.0 |

The above figures represent percentage by weight.

The refractory is suitably conditioned by holding in an oxidising atmosphere at a temperature of at least 1450° C. for a period of at least 24 hours or alternatively the refractory may be conditioned by maintaining in contact with molten glass at a temperature of at least 1450° C. for a period of at least 24 hours. Below the fusion cast refractory 30 is an insulating base 31.

It will be seen from FIG. 1 that the fusion cast refractory for use in the refining zone forms a base for the full length of the refining zone in which uniflow conditions exist. The step 25 may also be formed of the fusion cast refractory.

In the arrangement shown in FIGS. 1 and 2, the change of width combined with the change of depth at the junction of the melting and refining zones effectively separates the melting zone from the refining zone. However, in some embodiments the separation may be increased by the provision of a narrow channel as indicated at 35 in FIG. 3. This channel interconnects the melting zone 12 with the refining zone 13.

In some cases it may be considered preferable to insert an additional barrier such as the water pipe 36 shown in FIG. 3 adjacent the outlet of the melting zone. Such a water pipe 36 may be located in the upper region of the forward flowing glass adjacent the outlet of the melting zone and thereby restrict the surface flow and avoid light scum from the batch blanket in the melting zone passing into the refining zone. In some cases it may be considered desirable to remove additional heat from the glass as it leaves the refining zone and enters the conditioning zone and this may be achieved by the provision of cooling means such as one or more water pipes 37 indicated in FIG. 3 adjacent the junction of the refining and conditioning zones. Such water pipes 37 may be immersed in the molten glass at selected depths depending on the cooling required. One or more rows of stirrers as indicated at 38 may be located downstream of the barrier 37 as is described in our UK Patent Specification No. 1503145.

Figure 4:
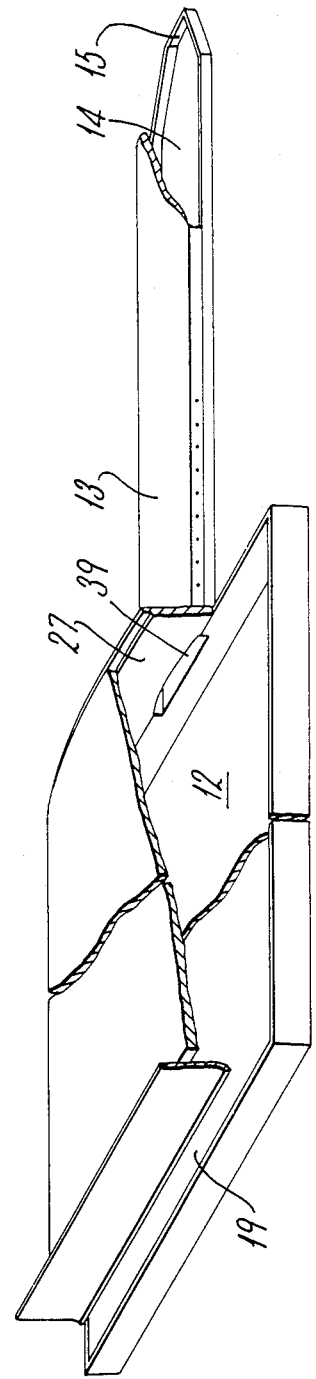
FIG. 4 is a cut-away perspective view of a further embodiment of the present invention.

FIG. 4 shows a cut-away perspective view as an alternative arrangement. In this case the melting zone 12 is arranged to communicate through a restricted aperture 39 into the shallow narrow refining zone 13. The melting zone in this case is provided with heat energy solely from electric heaters. The refining zone is again arranged to provide flow of molten glass only forwards towards the outlet end of the tank and the base of the refining zone is formed of refractory blocks of a fusion cast refractory suitably conditioned as previously described so as to avoid unwanted interaction between the glass and the base of the refining zone. In the case of an electric furnace of this type it is important to prevent movement of batch or foam from the melting zone into the refining zone and the limited slot or aperture 39 formed in the end wall 27 of the melting zone provides good control of the glass which is allowed to flow into the refining zone so as to achieve suitable quality of glass for subsequent feeding to the float process.

FIG. 5 shows an alternative arrangement in part of an electrically heated furnace. Similar reference numerals have been used for similar parts and in this case heating is solely from electrodes 21 in the melting zone 12. In this case the flow in the refining zone 13 is entirely forwards towards the outlet end and the base 30 of the refining zone as well as the vertical step 25 separating the deep melting zone from the shallow refining zone is formed of the conditioned fusion cast refractory previously described with reference to FIG. 1. In this example the flows within the molten glass have been diagrammatically illustrated and in this case it is apparent that there is no stable uprise of molten glass at a hot-spot intermediate the melting and conditioning zones. A deep refractory barrier 40 is provided at the intersection of the melting and refining zones. This impedes surface flow from the melting zone to the refining zone so that any batch material 20 or surface scum is prevented from flowing into the refining zone as the molten glass must pass below the barrier 40 before entering the refining zone. The barrier 40 is protected by a molybdenum lining 41 acting as a casing around the barrier and a water box 42 is provided on both sides of the barrier 40 at the level of the surface of the molten glass. The end wall 27 at the downstream end of the melting zone has been indicated and this marks the end of the wide melting zone and the beginning of the narrow section which leads to the refining and conditioning zones. The blocks of fusion cast refractory at the junction of the base 30 of the refining zone and the step 25 are protected by a molybdenum lining 43.

It will be appreciated that in all the above examples, a substantial part of the heat input may be provided by electric heaters which do not give rise to the conventional convection flows and stablised hot-spot referred to above. This in turn enables a uniflow refiner to be used as the stabilised hot-spot is no longer required and the provision of the suitably conditioned fusion cast refractory comprising alumina silica and between 31% and 43% by weight of zirconia for the refractory in the refining zone which contacts the molten glass enables satisfactory refining temperatures to be used without undesirable interaction with the molten glass which would prevent an acceptable glass quality being achieved.

In each of the above examples the refining zone 13 has a depth such that under the operating conditions used all the glass flow through the refining zone is towards the outlet end with no return flow. The improved fusion cast refractory used at the base of the refining zone 13 in FIG. 1 may however be used with advantage in a glass melting tank in which the refining zone is deep enough to permit a small amount of return flow. Such an arrangement is shown in FIG. 6. The glass melting tank of FIG. 6 is generally similar to that of FIG. 1 and similar reference numerals have been used for corresponding parts. The description of the common parts will not be repeated. However, in this case the refining zone 13 is deeper than that shown in FIG. 1. The refining zone 13 has a depth intermediate that of the melting zone 12 and that of the conditioning zone 14. The step 25 at the junction of the melting and refining zones has an upstanding projection 45 which extends across the width of the refining zone and provides a barrier to prevent any return flowing glass in the refining zone from entering the melting zone. At the downstream end of the refining zone 13, a further step 46 is provided adjacent the junction of the refining zone 46 with the conditioning zone 14. The step 46 enables the forward flowing glass in the refining zone to pass over the step into the conditioning zone 14 whereas the smaller proportion of return flowing glass changes direction adjacent the step 46 and forms a return flow adjacent the refractory base 30 at the bottom of the refining zone. The refining zone 13 and conditioning zone 14 are of the same width which is approximately half the width of the melting zone 12. The depth of glass in the refining zone 13 may be approximately twice the depth of glass in the conditioning zone 14. The glass in the melting zone 12 does however have a depth substantially greater than that of the glass in the refining zone 13. In this example the major portion of the glass in the refining zone flows forwardly into the conditioning zone 14 and only a minor portion returns as a return flow towards the melting zone 12. The ratio of the quantity of glass in the return flow to forward flow in the refining zone is less than 1:2 and is preferably approximately 1:4. In other words, there is always a substantially greater amount of glass in the forward flow rather than in the return flow. This results in a relatively slow moving region of return flowing glass adjacent the refractory material at the base of the refining zone 13 and the temperature adjacent the base of the refining zone will be of the order of 1400° to 1420° C. for typical soda-lime-silica glasses used in the manufacture of flat glass. By use at the base of the refining zone of fusion cast refractory material as previously described which has been conditioned at temperatures above 1450° C. for sufficient time, it is possible to achieve satisfactory glass quality without undue contamination from the refractory at the base of the refining zone.

It will be appreciated that as the volume of return flowing glass is low, the additional thermal requirements for reheating the glass adjacent the inlet to the refining zone 13 is minimised. Consequently the overall characteristics of operating this example of FIG. 6 are substantially the same as the uniflow arrangement described with reference to FIG. 1.

It will be appreciated that the refractory material may be manufactured and suitably conditioned by subjecting to the suitable temperature conditions in an oxidising environment prior to assembly into the glass melting tank. Alternatively the fusion cast refractory may be formed into blocks and provided as a base for the refining zone and the conditioning may be achieved by subjecting the refractory material to molten glass temperatures in excess of those required in the normal refining operation for periods of 24 hours or more so that suitable conditioning is achieved before the glass melting tank is used in the production of saleable glass.

The invention is not limited to the details of the foregoing examples.

I claim:

1. A glass melting tank having a melting zone for melting batch material to form molten glass and a shallow refining zone for refining the molten glass, the refining zone providing a shallow glass flow path wherein the major portion of the glass flow is forwards away from the melting zone, wherein said refining zone has a base with a fusion cast refractory material in contact with the molten glass, said fusion cast refractory material comprising alumina, silica and between 31% and 43% by weight of zirconia and being conditioned by oxidation at a temperature of at least 1450° C. for a period of at least 24 hours whereby the conditioned, fusion cast refractory may be used in contact with molten glass in said shallow refining zone at a temperature of 1450° C. with reduced bubble formation from interaction between the molten glass and the fused refractory.

2. A glass melting tank according to claim 1 wherein the melting zone provides a deeper region of molten glass than the refining zone, in which deeper region glass may flow in a forward direction towards the refining zone and in which return flows may also occur.

3. A glass melting tank according to claim 2 wherein the tank includes a step between a deep region of the melting zone and a shallower region of the refining zone.

4. A glass melting tank according to claim 3 wherein the refining zone is narrower than the melting zone.

5. A glass melting tank according to claim 4 wherein the melting zone includes means restricting the flow path into the refining zone in addition to a step.

6. A glass melting tank according to claim 5 wherein the means restricting the flow from the melting zone includes means inhibiting surface flow of molten glass from the melting zone into the refining zone.

7. A glass melting tank according to claim 5 wherein the means restricting the flow comprises a restricted aperture in an end wall of the melting zone adjacent the refining zone.

8. A glass melting tank according to claim 5 wherein the means restricting the flow from the melting zone to the refining zone comprise a throat providing a restricted flow passage below the surface level of the molten glass.

9. A glass melting tank according to claim 1 including a conditioning zone into which glass may flow from the refining zone, the conditioning zone being connected to an outlet and arranged to condition thermally the glass before supplying the glass to a forming process.

10. A glass melting tank according to claim 9 wherein the conditioning zone is arranged to contain the same depth of glass as the refining zone whereby the glass flow through both the refining and conditioning zones is entirely towards said outlet.

11. A glass melting tank according to claim 9 wherein the refining zone has a depth which permits some return flow of glass within the refining zone (13), the ratio of return flow to forward flow being less than 1:2.

12. A glass melting tank according to claim 1 wherein the melting zone is provided with heating means for applying heat to melt the batch material, said heating means including electrical heating means arranged to provide at least 15% of the heat requirement to melt the batch material.

13. An electric glass melting tank according to claim 12 wherein heat is provided to melt the batch material by a plurality of electrical heating electrodes located within the melting zone.

14. A glass melting tank according to claim 13 in which the tank is arranged to supply glass to a flat glass forming process such as a float process which is connected to an outlet of the tank.

15. A fusion cast refractory for use in a glass melting tank, which fusion cast refractory comprises alumina, silica and between 31% and 43% by weight of zirconia, wherein the fusion cast refractory is conditioned by oxidation at a temperature of at least 1450° C. for a period of at least 24 hours whereby the fusion cast refractory may be used in contact with molten glass at a temperature of 1450° C. without bubble formation from interaction between the molten glass and the fused refractory.

16. A method of forming a refractory for use in a glass melting tank, which method comprises heating a fusion cast refractory comprised of alumina, silica and between 31% and 43% by weight of zirconia at a temperature of at least 1450° C. for a period of at least 24 hours so as to cause oxidation whereby the fusion cast refractory may be used in contact with molten glass at a temperature of 1450°0 C. without excessive bubble formation from interaction between the molten glass and the fusion cast refractory.

* * * * *